United States Patent [19]

Rawlyk et al.

[11] Patent Number: 4,949,537
[45] Date of Patent: Aug. 21, 1990

[54] MANUFACTURE OF OPTICAL CABLE
[75] Inventors: Michael G. Rawlyk; Neale E. Felske, both of Saskatoon, Canada
[73] Assignee: Northern Telecom Limited, Montreal, Canada
[21] Appl. No.: 435,117
[22] Filed: Nov. 13, 1989
[51] Int. Cl.⁵ .......................... G02B 6/10; H01P 11/00
[52] U.S. Cl. .............................................. 57/7; 57/13; 57/295; 156/166; 264/174
[58] Field of Search .................. 57/7, 13, 3, 295, 297; 156/296, 166; 264/174, 136; 427/163, 434.6

[56] References Cited
U.S. PATENT DOCUMENTS

| | | |
|---|---|---|
| 3,937,772 | 2/1976 | Urban et al. .................. 264/171 X |
| 4,130,450 | 12/1978 | Bahder et al. ................ 264/174 X |
| 4,332,543 | 6/1982 | Fulton et al. ............... 425/378.1 X |
| 4,548,664 | 10/1985 | Canivet ........................... 156/166 |
| 4,706,449 | 11/1987 | Akre ................................ 576/13 X |
| 4,707,977 | 11/1987 | Cousin et al. ...................... 57/297 |
| 4,783,954 | 11/1988 | Akre .................................. 57/13 X |
| 4,784,461 | 11/1988 | Abe et al. ...................... 350/96.23 |
| 4,805,392 | 2/1989 | Seveso et al. ..................... 57/13 X |
| 4,833,871 | 5/1989 | Ogawa et al. ..................... 57/13 X |

FOREIGN PATENT DOCUMENTS 3225228  1/1983  Fed. Rep. of Germany ........... 57/7

Primary Examiner—Joseph J. Hail, III
Attorney, Agent, or Firm—R. J. Austin

[57] ABSTRACT

Method and apparatus for locating viscous water blocking material beneath a tube in a groove of a core member of an optical cable. The material is laid into the base of the groove and the tube inserted into the groove so as to displace the material from the base and around the tube while a space between the tube and base of the groove remains filled with the material.

8 Claims, 3 Drawing Sheets

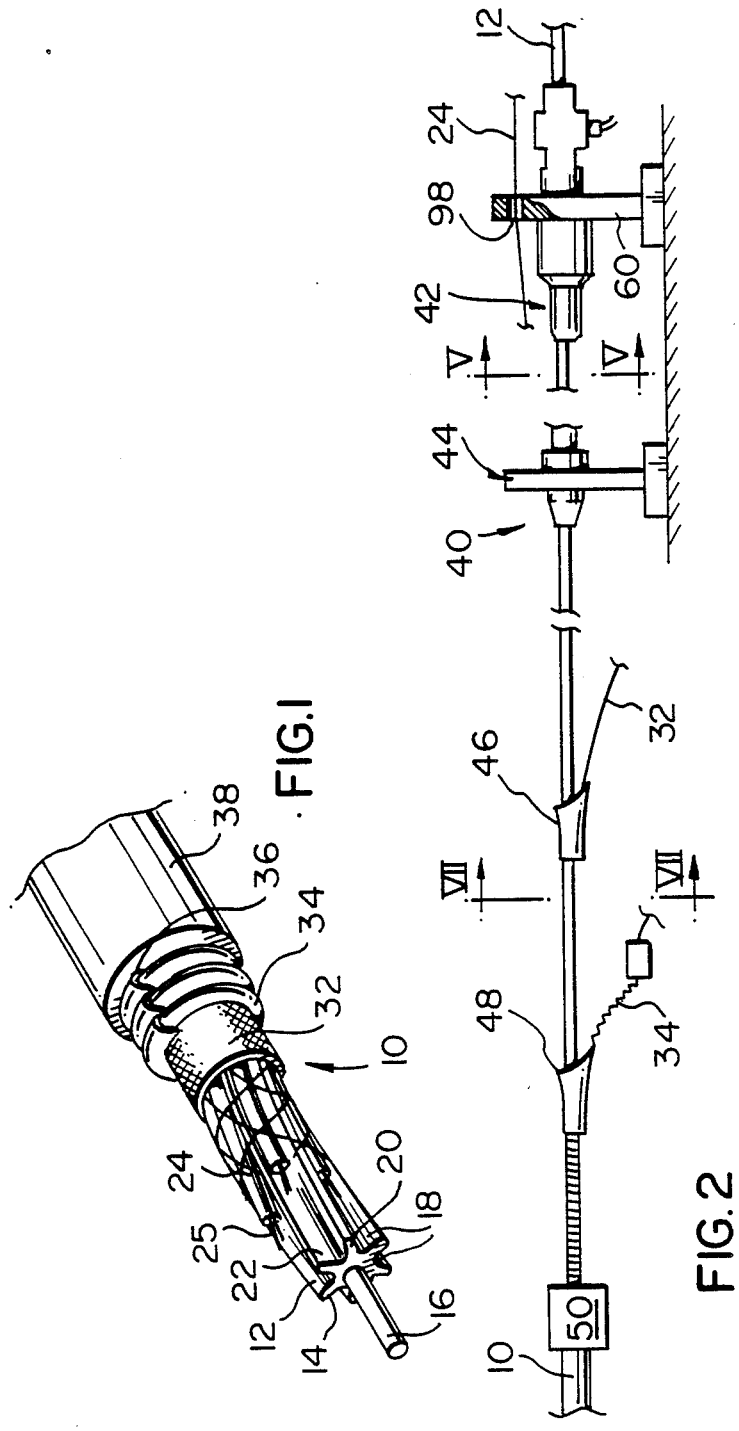

MANUFACTURE OF OPTICAL CABLE

This invention relates to the manufacture of optical cable.

Although optical cable technology is relatively recent compared to that of electrical telecommunications cable, optical cables of different constructions have nevertheless now been developed. In one type of optical cable, a longitudinally extending core member is provided and which is formed from extruded plastic material. The core member has a plurality of longitudinally extending grooves spaced apart angularly around a longitudinal axis of the core member and some at least of these grooves contain at least one optical fiber or, preferably, groups of fibers. More recently, an optical cable has been developed in which single optical fibers or groups of optical fibers are housed within flexible tubes and these tubes are contained within and extend along the grooves. This structure is as described in U.S. Pat. No. 4,784,461 granted Nov. 15, 1988 to K. Abe. In cases where it is desired to provide a water blocking cable, the completed core including the fiber containing tubes is then treated, as is normally the case with cores of all water blocking cables, with a pressurizable viscous grease or jelly like water blocking material which is intended to fill all the spaces of the grooves unoccupied by the tubes. However, it is found that after such treatment, cables of this structure are not satisfactory in repelling moisture and in preventing the moisture from travelling along the core.

The present invention provides a method and apparatus which, in use, seeks to obviate or minimize the above disadvantages.

Accordingly, the present invention provides a method of locating a flexible tube and a water blocking material along a groove in core member during manufacture of an optical cable comprising passing the core member along a passline and through a water blocking material application station and laying a viscous displaceable water blocking material progressively along and into contact with a base of the groove at the water blocking material application station; and then laying the flexible tube progressively along and into the groove and towards the base of the groove to contact the water blocking material and displace it upwardly from the base of the groove and between the tube and sides of the groove so as to fill a space in the base region of the groove with the water blocking material, the space in the base region defined below nips provided between the surface of the tube and sides of the groove.

With the above method, any spaces extending longitudinally of the base regions of the groove are thus filled with grease to prevent access to and movement of moisture along the spaces.

Water blocking material may then be provided as desired to provide water blocking for spaces in the grooves above the nips, i.e. towards the openings to the grooves, these spaces above the nips being readily accessible from outside of the core member with the tube mounted in position. Water blocking material for this particular purpose may be additional grease or jelly like material passed under pressure into these spaces above the nips. Alternatively, a swellable water blocking material placed around the core member is provided so as to swell and fill the spaces above the nips upon contact with the swellable material by water.

In preferred optical cable constructions having grooves in core members, these grooves extend along the core members as they extend longitudinally of the core members. In such cases the method comprises forcing the water blocking material from a passage and through an outlet into the base of the groove while controlling the alignment of the outlet with the groove to ensure the continuous laying of the material along and into the groove. For this purpose, a guide member for aligning the outlet with the groove may be disposed within the groove so as to rotate with the groove around the longitudinal axis of the core member. The outlet may be provided in the guide member and directed towards the base of the groove for forcing the water blocking material through the outlet and directly into the base. Alternatively, the outlet may be provided in a separate member disposed adjacent to the guide member and along the passline therefrom so as to be moved by the guide member as it rotates around the longitudinal axis of the core member.

The present invention also provides according to a further aspect, an apparatus for locating a flexible tube and water blocking material along a groove in a core member during manufacture of an optical cable comprising:- a water blocking material applicator having a passage for movement of pressurized displaceable water blocking material, the applicator having an outlet at a water blocking material application station, the outlet facing towards a passline for the core member for laying the water blocking material into and along the groove; and means downstream along the passline from the water blocking material applicator for guiding the flexible tube into and along the groove.

Embodiments of the invention will now be described, by way of example, with reference to the accompanying drawings, in which:

FIG. 1 is an isometric view of part of an optical cable made with apparatus according to the embodiment;

FIG. 2 is a diagrammatic side elevational view of an apparatus according to the embodiment and for manufacturing the cable shown in FIG. 1;

Figure 3:
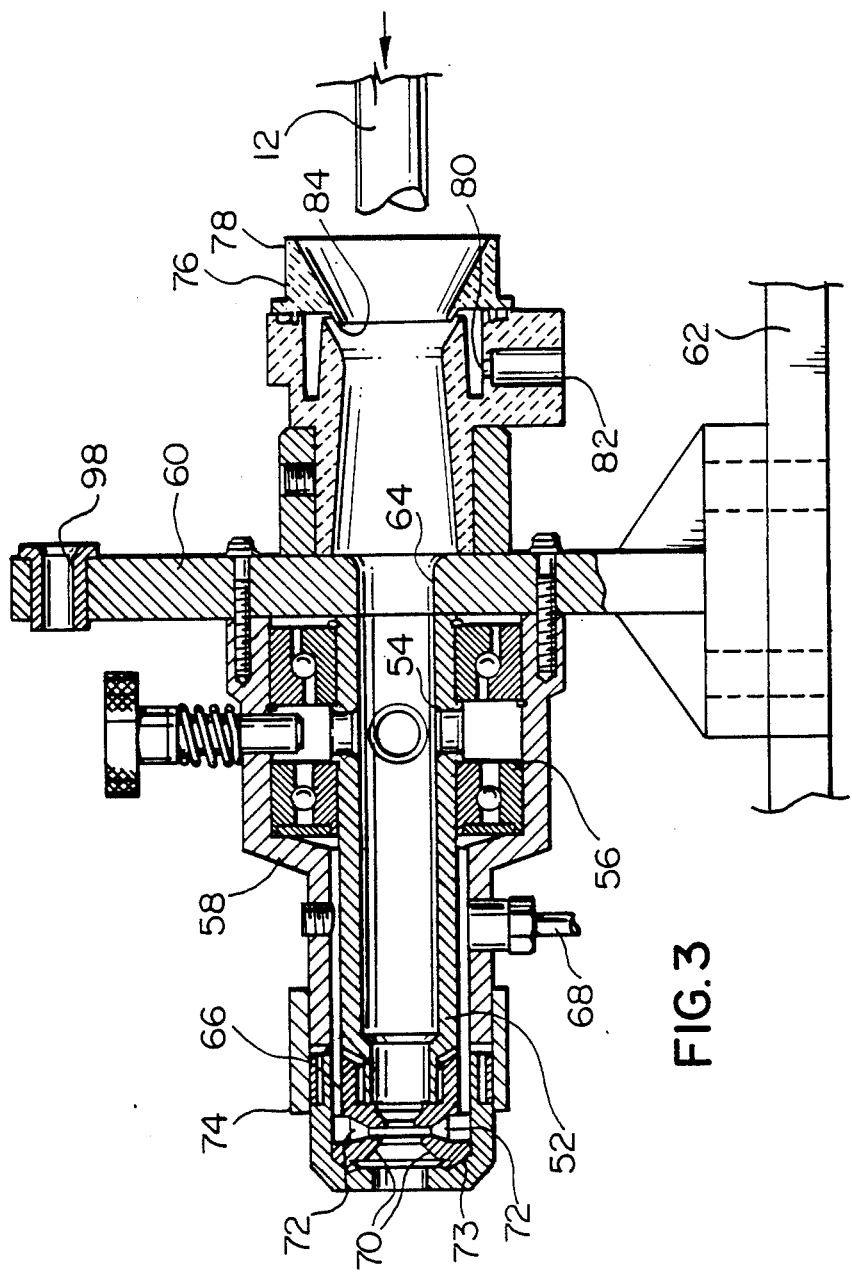
FIG. 3 is a side elevational view in cross-section of a water blocking material applicator forming part of the apparatus shown in FIG. 2 and on a larger scale than FIG. 2.

An optical cable 10 (FIG. 1) which is to be made by apparatus to be described, comprises a central core member 12 comprising an extruded elongate plastics member 14 surrounding a tensile reinforcing member 16. The core member 12 is formed in conventional fashion and is provided during its manufacture with a plurality (namely six) of longitudinally extending grooves 18 which are equally spaced-apart along a longitudinal axis of the core member. These grooves 18 extend in sinuous fashion, as is known, along the core member and are separated by radially extending ribs 20 which define sides 22 of the grooves, the ribs extending outwardly to free ends which lie upon the circumference of a common circle.

Figure 7:
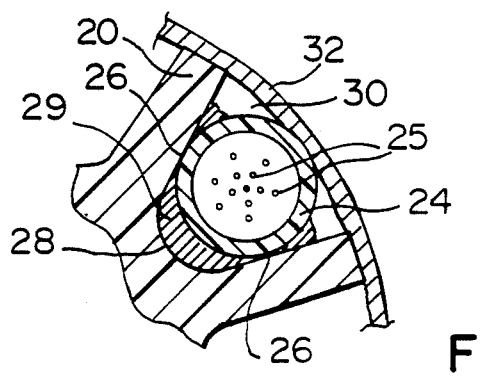
FIG. 7 is a cross-sectional view through part of the core taken along line VII—VII in FIG. 2 and to the same scale as FIG. 6.

Each groove is occupied by a longitudinally extending flexible tube 24 formed from a suitable extrudable plastics material. Each tube carries within it a group 25 of optical fibers. Each tube lies towards the base of its respective groove and the diameter of each tube is such that it converges upon each side 22 of its groove to form nips 26 with the sides while being spaced from the base surface 28 of the groove as shown in FIG. 7. A space in the base region of each groove, i.e. below the nips 26 and to the base surface 28, is completely occupied with a suitable grease or jelly-like water blocking material 29, a thin layer of which also extends through the nips 26 and outwardly to spaces in the groove above the nips and outwardly to openings 30 of the groove.

Immediately surrounding the core member 12 is a layer 32 of material which is swellable upon contact with moisture so as to provide a water blocking function. This layer 32 is of known construction and comprises one or more substrates which may be of paper or other non-woven material, the substrate carrying particles of swellable material which may be sodium polyacrylate. As shown in FIG. 1, the layer 32 is wrapped completely around the core member and tubes and while it may extend partly into the openings 30 to the grooves, it need not, in a dry unswelled condition, completely fill the space above and lie in contact with the grease or jelly-like water blocking material 29.

Immediately surrounding the swellable layer 32 is a conventional corrugated metallic shield 34 with overlapped ends 36 as shown in FIG. 1, the shield being surrounded by an extruded jacket 38 of suitable polymeric material.

After the manufacture of the core member 12, in conventional fashion by extrusion, the cable is completed upon the apparatus 40 according to the embodiment and shown generally in FIG. 2. As shown by FIG. 2, the apparatus 40 comprises a water blocking material applicator 42 at a specific position along a passline for the core member 12, and means 44 for guiding a plurality (namely six) tubes 24, one into each of the grooves 18, the means 44 being disposed downstream of the applicator 42. In order downstream from the guiding means 44 is disposed an applicator 46 for the swellable layer 32, an applicator 48 for the corrugated shield 34, and an extrusion head 50 for forming the jacket layer 38 around the shield. The applicators 46 and 48 and the extrusion head are of conventional design and require no further description.

As shown in greater detail in FIG. 3, the applicator 42 comprises a generally cylindrical head 52 which has a central passageway 54 and is concentrically mounted around the passline for the core member 12. The cylindrical head 52 is rotatably mounted at an upstream end region in bearings 56 which are carried by a surrounding basically cylindrical non-rotatable housing 58 which is held at its upstream end in a vertical frame member 60 attached to a supporting frame 62. Frame member 60 has a passage 64 aligned with the passage 54 of the head 52. Downstream from the bearings 56 is disposed a cylindrical chamber 66 for the passage of pressurized grease or jelly-like water blocking material, the chamber 66 being defined between the rotatable head and the surrounding housing 58. An inlet 68 is provided through the housing 58 for passage of the pressurized water blocking material into an upstream end region of the chamber 66.

At the downstream end region of the head 52 and at a water blocking material application station, there are provided six guide members 70, the guide members extending inwardly of the passage 54 so as to be disposed within each of the grooves 18 of the core member. Thus, as the core member 12 passes through the application station, the grooves 18 rotate at this station around the longitudinal axis of the core member in sinuous fashion thereby carrying the guide members 70 with the grooves and causing the rotatable head 52 to rotate in alternate directions around the passline and as dictated by the angular movement of the grooves 18 around the core member. Six outlets 72 are provided from the chamber 66 for pressurized water blocking material to cause it be deposited into each groove and into contact with the base surface 28 of the groove. Outlets 72 are provided at inner ends of each of the guide members 70 so as to be disposed close to the base surfaces of the grooves while being directed towards them. A seal 73 is provided at the downstream end of the head 52 to prevent water blocking material under pressure from escaping between the head and an end of the housing 58.

Towards the downstream end of the applicator, there is disposed an annular electric heater 74 which surrounds the housing 58 for the purpose of maintaining a sufficiently high temperature of the water blocking material in the chamber 66 to ensure it has freedom to flow under pressure through the outlets 72. This heater 74 is particularly useful upon restart of the use of the apparatus when the water blocking material may have cooled too far to ensure freedom of flow.

In addition, the applicator 42 is provided with an air flow directing means 76 disposed upstream from the head 52 for directing air downstream towards the head for cooling the water blocking material as it is being deposited into the bases of the grooves so as to prevent overheating and possible degradation of the core member. This air flow directing means comprises an annulus 78 having an annular air flow chamber 80 with an inlet 82 for pressurized air and an annular outlet 84 which is directed in the downstream direction as is required.

Figure 4:
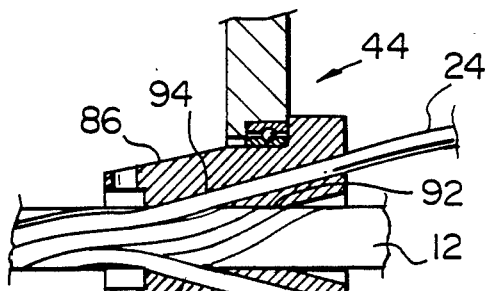
FIG. 4 is a side elevational view in cross-section and to the scale of FIG. 3, of a tube laying head forming part of the apparatus shown in FIG. 2.

As shown by FIG. 4, the tube guiding means 44 comprises an annular head 86 which is rotatably mounted by bearings 88 within a vertical frame member 90 extending upwardly from the machine frame 62. The head 86 has a coaxial passageway 92 surrounding the passline for the core member and six guide passages 94 which are equally spaced apart around the passline and are inclined as shown in FIG. 4 from an upstream end towards the downstream end for directing the tubes 24 into the grooves 18.

Figure 5:
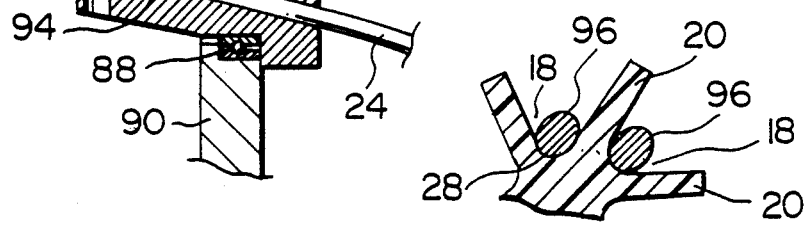
FIG. 5 is a cross-sectional view through a core member taken along line V—V in FIG. 2 and to a larger scale.

In use of the apparatus as shown in FIGS. 2, 3 and 4, the core member 12 is fed along its feedpath through the applicator 42, the tube guiding means 44 and then through the applicators 46 and 48 and through the extrusion head 50. As the core member proceeds through the applicator 42, the grease or jelly-like water blocking material is fed under pressure through the inlet 68 and into the chamber 66 so as to be forced from the outlets 72. With the guide members 70 located within the grooves 18 so as to rotate with the grease around the core member at the application station, the water blocking material is passed in a continuous fashion into each of the grooves and is directed into the base and against the base surface 28 of each of the grooves. As may be seen from FIG. 5, the water blocking material is laid against the base surfaces of the grooves in the form of beads 96 of substantially circular cross-section.

The core member then carrying the beads 96 of water blocking material proceeds through the tube guiding means 44 in which the tubes 24, each carrying its own group of optical fibers 25, are laid along the grooves 18. As can be seen from FIG. 2, the tubes 24 are guided from storage reels (not shown) towards the head 86 and for this purpose in the embodiment, the frame member 60 is formed with angularly spaced guide holes 98 through which the tubes pass as they move towards the inclined guide passages 94 in the head 86. The tubes pass along the inclined guide passages 94 and are directed into each of the grooves 18, the core member 12 during its forward movement drawing the tubes into the grooves from a storage source upstream (not shown). For the purpose of laying the tubes into the grooves, guides are not required in the head 86 for causing rotation of the head with the grooves around the core member as the tubes themselves are sufficiently stiff to cause rotation of the head in the appropriate fashion as the tubes move into the grooves.

Figure 6:
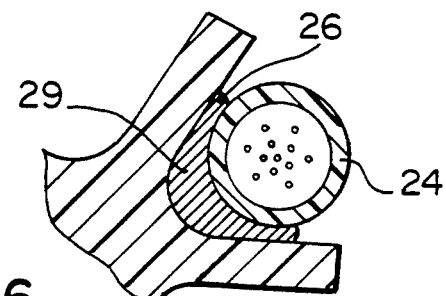
FIG. 6 is a cross-sectional view through part of a core taken along line VI—VI in FIG. 4 and shown to a larger scale than the core member in FIG. 5.

The drawing action of the core member upon the tubes combined with the movement of the grooves around the core member cause the tubes to be pulled down into their respective grooves so that they approach both the convergent sides of the grooves and the beads 96 in the bases of the grooves. The diameters of the beads are such that each bead is contacted by its associated tube as the downward movement of the tube progresses so that this downward movement causes a certain quantity of the water blocking material to be displaced outwardly towards the entrance of the groove and around both sides of the tube. The water blocking material is displaced through a nip 26 of decreasing width between the tube and each side 22 of the groove as the tube moves downwardly as shown in FIG. 6, until in a final position of each tube as shown in FIG. 7, a base region downwardly from the nips 26 is completely filled with the water blocking material 29. This material extends also as a thin film through each nip and occupies some of the space at each side of the tube outwardly of the nips and towards the opening 30 to the groove.

The core member 12 carrying the tubes and the water blocking material 29 which has been formed from the beads 96 then proceeds through the tape applicator 46 at which position the swellable layer 32 is formed around the core in known manner for wrapping layers of tape around cores in the production of cables. As may be seen from FIG. 7, with the layer 32 in position, the layer may project slightly into the opening 30 of each of the grooves without contacting the outer surface of the water blocking material 29 in that particular groove.

The partially completed cable then passes through the shield applicator 48 and through the extrusion head 50 to complete the cable 10 in conventional manner.

In use of the cable 10, when installed in the ground, the water blocking material 29 and the swellable layer 32 in combination are completely successful in preventing ingress of moisture and progression of moisture along the cable beneath the shield. Although a gap may exist along each groove between the layer 32 and the water blocking material 29 (FIG. 7), should the layer 32 be contacted by moisture, then the swellable material immediately increases in volume so as to contact the water blocking material 29 in the region of the moisture and provide an effective moisture block in the outer regions of the grooves. As the remainder of each groove is completely filled with the water blocking material 29, both inwardly and outwardly of its respective tube 24, then moisture is effectively prevented from travelling along the groove.

It should be noted in particular that the method and apparatus of the first embodiment and according to the invention ensure that the base regions of each groove are completely filled with the grease or jelly-like water blocking material so that water cannot flow along these base regions to cause damage to the cable. It should also be noted that if the swellable layer 32 is contacted by moisture, it not only swells inwardly into each groove so as to contact the water blocking material 29 as described, but also swells outwardly so as to intimately contact the inner surface of the shield 34 and to fill the corrugations so that water blocking is effectively ensured between these two layers.

Figure 8:
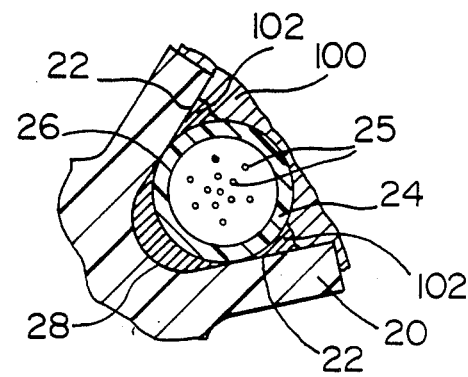
FIG. 8 is a cross-section similar to FIG. 7 and shows a core construction forming a modification of that shown in FIG. 7 and provided upon an apparatus modified from that of the first embodiment.

In a modification of the first embodiment, as shown in FIG. 8, an optical cable is not provided with a swellable layer 32 but instead, after the provision of the water blocking material 29 in each of the grooves, is provided with further deformable grease or jelly-like water blocking material 100 in the outer regions of the grooves and possibly around the free ends of the ribs 20. The apparatus for providing this construction differs from the apparatus of the first embodiment solely in that the tape applicator 46 is replaced with a conventional applicator for applying the water blocking material 100 under pressure to the outside of the core member. As can be seen from FIG. 8 this additional water blocking material 100 engages the water blocking material 29 and merges with it along an interfacial region 102 in each groove so as to completely block each groove from moisture ingress and axial movement along the cable.

What is claimed is:

1. A method of locating a flexible tube and water blocking material along a groove in a core member during manufacture of an optical cable comprising:-
    passing the core member along a passline and through a water blocking material application station;
    at the water blocking material application station, laying a viscous displaceable water blocking material progressively along the groove and into contact with a base surface of the groove so as to only fill a base region of the groove;
    laying the flexible tube progressively along and into the groove and towards the base of the groove so as to contact the water blocking material; and
    then continuing the movement of the flexible tube into the water blocking material while displacing the water blocking material between the tube and sides of the groove so as to fill a space in the base region of the groove with the water blocking material, the space in the base region defined below nips provided between the surface of the tube and sides of the groove.

2. A method according to claim 1 wherein the groove extends around the core member as it extends along the core member, the method comprising forcing the water blocking material from a passage and through an outlet and into contact with the base surface of the groove while controlling the alignment of the outlet with the groove to ensure the continuous laying of the material along and into the groove.

3. A method according to claim 2 comprising providing a guide member for aligning the outlet with the groove, the guide member defining the outlet; locating the guide member within the groove with the outlet directed towards the base of the groove so that the guide member is carried by the groove around the core member; and forcing the water blocking material through the outlet and into the base of the groove.

4. Apparatus for locating a flexible tube and water blocking material along a groove in a core member during manufacture of an optical cable comprising:-
 a water blocking material applicator having a passage for movement of pressurized displaceable water blocking material, the applicator having an outlet at a water blocking material application station, the outlet facing towards a passline for the core member for laying the water blocking material into and along the groove;
 means downstream along the passline from the water blocking material applicator for guiding the flexible tube into and along the groove; and
 an air flow directing means disposed upstream from the outlet to the passage, the airflow directing means oriented to direct a flow of air downstream through the head and to the outlet.

5. Apparatus according to claim 4 wherein the applicator has a head which is rotatable around the passline and has a guide member for location within the groove, the guide member extending from the head towards the passline and defining the outlet which also faces towards the passline.

6. Apparatus according to claim 4 having a heater for applying heat to the passage for movement of the displaceable deformable water blocking material.

7. Apparatus for locating a flexible tube and water blocking material along a groove in a core member during manufacture of an optical cable comprising:-
 a water blocking material applicator having an annular head which is rotatable around a passline for the core member, the head defining a first passage extending along the passline for movement therethrough of the core member and a second passage for movement of pressurized displaceable water blocking material, the second passage laying radially outside of the first passage with regard to the passline, and the head also having, at a water blocking material application station, a guide member for directing water blocking material into a base region of the groove, the guide member extending inwardly into the first passage for location within the groove, the guide member terminating in a radially inner end with respect to the passline and having an outlet from the second passage, the outlet provided at the radially inner end of the guide member and directed towards the passline; and
 means downstream along the passline from the water blocking material applicator for guiding the flexible tube into and along the groove.

8. Apparatus according to claim 7 for locating a plurality of flexible tubes and water blocking material along a plurality of grooves spaced apart around the core member, the apparatus comprising a plurality of guide members angularly spaced apart around the passline, each guide member extending from the head towards the passline for location within a groove and defining an outlet from the passage and which also faces towards the passline.

* * * * *